Figure 1:
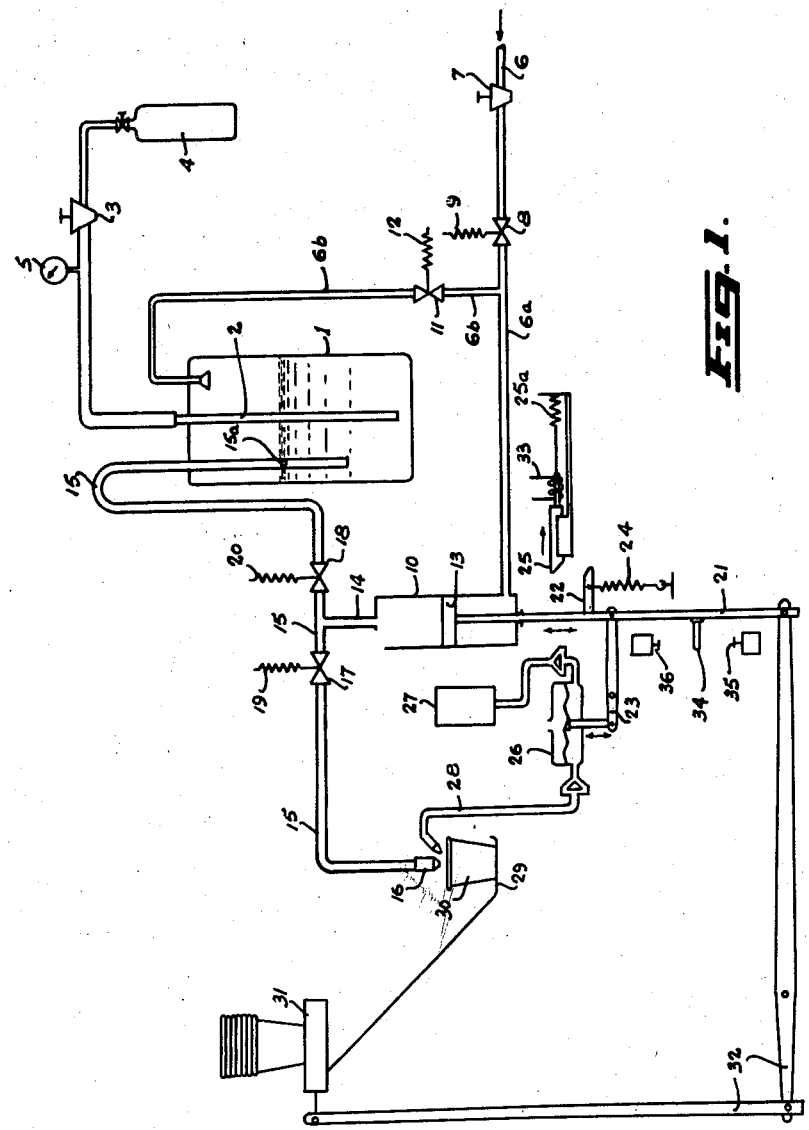

Dec. 2, 1958  J. W. BELL  2,862,530
LIQUID DISPENSING MECHANISM
Filed Dec. 6, 1956  2 Sheets-Sheet 1

INVENTOR:
JOHN W. BELL
BY Cushman, Darby & Cushman
ATTORNEYS.

Dec. 2, 1958                J. W. BELL                2,862,530
                    LIQUID DISPENSING MECHANISM
Filed Dec. 6, 1956                              2 Sheets-Sheet 2

INVENTOR:

JOHN W. BELL

BY: Cushman, Darby & Cushman
                ATTORNEYS

2,862,530
Patented Dec. 2, 1958

2,862,530
LIQUID DISPENSING MECHANISM

John W. Bell, Georgetown, Ontario, Canada, assignor, by mesne assignments, to Vendomatic Limited, Toronto, Ontario, Canada Application December 6, 1956, Serial No. 626,754

Claims priority, application Canada January 30, 1956

12 Claims. (Cl. 141—100)

This invention relates to a mechanism for dispensing a measured quantity of a liquid. It is expected that this mechanism will find its chief application in vending machines employed for dispensing hot and cold beverages, and this application will therefore be chosen to exemplify the invention.

The primary object of the invention is to simplify such mechanisms. As will be later explained, many beverage dispensing machines require a pump; and the avoidance of this need is one of the principal simplifications furnished by the present invention. This object is accomplished by employing as the basic operating power of the liquid system the potential energy contained in a supply of liquid under pressure.

Although it is not intended to exclude the possibility of the liquid being other than water, as a practical matter the invention will find primary application in vending machines adapted to dispense a quantity of a beverage of which the chief ingredient is water, and in which such water is not previously mixed with other ingredients of the beverage but is drawn at the time of dispensing or shortly therebefore from a mains water supply and is mixed at or about the time of dispensing with the other ingredients of the beverage (syrup and carbon dioxide in the case of carbonated beverages; powdered and/or liquid concentrates in the case of hot beverages such as coffee).

The advantages of the present invention are especially pronounced in connection with the dispensing of carbonated beverages, because the designers of prior machines for this purpose have always found a pump to be an essential element if satisfactory operation is to be assured. The reason for this is that the carbonation process in the tank requires a carbon dioxide pressure of at least 60 pounds per square inch. Since many water supplies fall far below 60 p. s. i. many times per day, the pump is added to boost the pressure to enable water to be forced in the tank against the 60 p. s. i. pressure held in the tank by the carbon dioxide supply.

The present invention avoids the need for a pump by economising on the amount of energy released in the water in travelling from the tank (at at least 60 p. s. i. above atmosphere) to the drinking cup (at atmospheric pressure). This economy is effected by a system of balanced expansible chambers, and in this aspect the invention may be defined as consisting of a mechanism comprising a first expansible chamber; means continuously tending to diminish the volume of such chamber; a first conduit containing first valve means connecting said first chamber with a source of the primary liquid to be dispensed, said source being at a pressure sufficient to expand said first chamber against the force of the means tending to diminish the volume thereof; a second conduit extending from said first chamber to a tank; second valve means situated in said second conduit; a second expansible chamber coupled to said first expansible chamber whereby to expand when said first expansible chamber contracts and vice versa (these two expansible chambers may conveniently take the form of the two ends of a cylinder, the extent of each chamber being determined at any one time by the position of a piston movable along such cylinder); a further conduit extending from a lower part of said tank to said second expansible chamber; third valve means situated in such further conduit; a discharge conduit extending from said second expansible chamber; fourth valve means situated in said discharge conduit; and operating means for maintaining said second and third valve means closed while said first and fourth valve means are open to enable said first expansible chamber to receive liquid from said source and expand and thereby contract said second expansible chamber to expel liquid therefrom along said discharge conduit, and for subsequently closing said first and fourth valve means while opening said second and third valve means to enable said means tending to diminish the volume of said first expansible chamber to expel liquid therefrom into siad tank and to expand said second expansible chamber to draw liquid thereinto from said tank.

In the case of beverages not requiring carbonation, a still further simplified form of mechanism may be employed. In this somewhat broader aspect the invention may be defined as consisting of a mechanism compising only a single expansible chamber; means continuously tending to diminish the volume of said chamber; a first conduit containing first valve means connecting said chamber with a source of the primary liquid to be dispensed, such source being at a pressure sufficient to expand said chamber against the force of said means tending to diminish the volume thereof; a discharge conduit (preferably including along its length a tank in order to facilitate heating or cooling of the liquid) extending from said chamber; second valve means sitnated in said discharge conduit; and operating means for maintaining said second valve means closed while said first valve means are open to enable said expansible chamber to receive liquid from the source and expand, and for subsequently closing said first valve means while opening said second valve means to enable said means tending to diminish the volume of said chamber to expel such liquid therefrom and along said conduit.

The operating means, which will advantageously comprise a system of electric relays controlling the valve means, and limit switches for determining the condition of the expansible chamber or chambers, will normally be actuated by a conventional coin operated mechanism.

The accompanying drawings illustrate schematically in Figure 1 the liquid system of a dispensing machine constructed in accordance with the present invention and designed for dispensing cold carbonated drinks.

Figure 2:
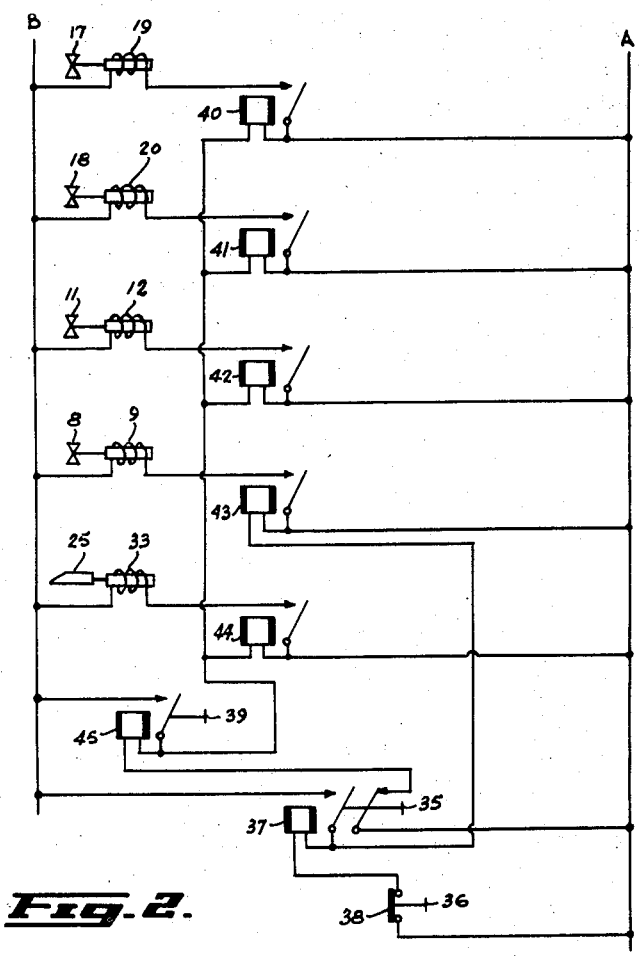

Figure 2 shows the electrical circuit of this machine.

Figure 3:
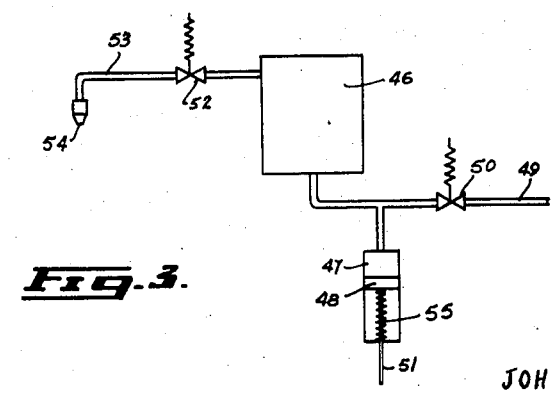

This machine may be modified for dispensing non-carbonated drinks, such as coffee, such a modification being demonstrated by Figure 3 which shows a portion of the simplified liquid system required.

Referring firstly to Figure 1, the main supply of water that will form the basic ingredient of the beverage is contained in a closed tank 1, which may be refrigerated or heated as required by means not shown. A pipe 2 extending to a point near the bottom of such tank 1 communicates through a reducing valve 3 with a bottle 4 in which carbon dioxide is stored under pressure. A pressure gauge 5 serves to determine the carbon dioxide pressure transmitted to the tank 1 and this pressure can be set by the reducing valve 3 to the value required for carbonization of the water within such tank to the desired extent.

Fresh water enters the system from the mains water supply through a conduit 6, passing through a reducing valve 7 and a normally closed shut-off valve 8 operated by a solenoid 9. Beyond the shut-off valve 8 the conduit 6 forks into two branches, the branch 6a leading to a cylinder 10, and the branch 6b leading to the upper part of the tank 1 through a normally closed shut-off valve 11 controlled by a solenoid 12.

Within the cylinder 10 there is slidably mounted a piston 13 in fluid-tight engagement with the wall of such cylinder, the conduit 6a leading into such cylinder adjacent the lower end thereof. At the other end of such cylinder 10 a conduit 14 connects the interior of the cylinder 10 above the piston 13 with a conduit 15 that extends between the tank 1 and a nozzle 16, two shut-off valves 17 and 18 operated respectively by solenoids 19 and 20 being arranged in this conduit 15, one on each side of the point of connection between such conduit and the conduit 14. Valve 17 is normally open; valve 18 is normally closed. The piston 13 is connected to a piston rod 21 bearing a rigid detent 22 and a pivoted link 23. A tension spring 24 extends between the detent 22 and a fixed part of the machine so as to tend to pull the piston 13 downwardly towards the bottom of the cylinder 10. A pawl 25 is arranged in the path of the detent 22 and is adapted to engage such detent and hold the piston 13 against the tension of the spring 24 whenever such piston is moved to the extreme upper end of the cylinder 10. The pawl 25 may be withdrawn by a solenoid 33, but is held in its projecting position by a compression spring 25a.

The link 23 connects the piston rod 21 with a syrup pump 26 which serves to pump a small quantity of syrup from a supply container 27 to an output conduit 28. This output conduit 28 terminates adjacent the nozzle 16 and above a platform 29 on which will be placed the vessel 30 to be filled. The platform 29 thus constitutes the drinking vessel charging station. This vessel may be assumed to be a paper or cardboard drinking cup, which can conveniently be dispensed from a supply of such cups by a conventional dispensing mechanism 31 mechanically operated by links 32 connected to the piston rod 21.

A further rigid link 34 on the piston rod 21 is arranged to co-operate with a pair of mechanical push rods 35 and 36 arranged at opposite ends of the travel of the link 34. These rods 35 perform the function of limit switches as will later appear.

Reference should now be made to Figure 2 showing the electrical circuit for this machine. Each of the solenoids 19, 20, 12, 9 and 33 is arranged to be normally unenergized (as shown), the valve 17 then being open whereas all the other valves 18, 11 and 8 will be closed. The pawl 25 will be in its detent engaging position when the solenoid 33 is unenergized. Individual energizing circuits for each of the solenoids 19, 20, 12, 9 and 33 extend from an electric power supply lead A to a second such lead B through the normally open contacts of relays 40, 41, 42, 43 and 44, respectively. The operating coils of the relays 40, 41, 42 and 44 are connected in parallel with one another across the lines A and B, and in series with the normally open contacts of a relay 45. The relay 45 forms part of a coin operated mechanism (not shown), the mechanical push rod 39 representing the mechanical linkage of this mechanism whereby the insertion of a coin acts momentarily to close the contacts of the relay 45 mechanically. The operating coil of the relay 45 is connected across the lines A and B through a series circuit of its own contacts and a pair of normally closed contacts of a relay 37. The relay 37 also includes a pair of normally open contacts which are arranged both in a circuit extending from the line B and through the relay 43 to the line A, and also in a circuit extending from the line B, through the energizing coil of the relay 37 and a pair of normally closed contacts 38 to the line A. The two pairs of contacts of the relay 37 are arranged for mechanical movement into their reverse positions by means of the push rod 35 which is acted upon by the link 34 at the extreme downward end of the stroke of the piston rod 21. The normally closed contacts 38 may be opened by the push rod 36 which is arranged for actuation by the link 34 at the extreme top end of the stroke of the piston rod 21.

The operation of the system is as follows:

When the system is idle the piston 13 will be in its upper position adjacent the top of the cylinder 10 and the detent 22 will be engaged by the pawl 25, thus holding the parts in this position. In this idle condition the spring 24 will be under tension, the valve 17 will be open but the remaining valves 8, 11 and 18 will all be closed. This is the condition seen in Figure 2.

When the system is operated by the coin operated mechanism, the push rod 39 will close relay 45 which will continue to be energized by its own now closed contacts. These contacts will also energize relays 40, 41, 42 and 44 which has the effect of closing the valve 17, opening the valves 18 and 11, and releasing the pawl 25. The force of the spring 24 which is equivalent to a fluid pressure on the surface of the piston 13 of about 5 pounds per square inch is then effective to force water already in the lower part of the cylinder 10 along conduits 6a and 6b and into the tank 1, while drawing carbonated water from the tank 1 along conduits 15 and 14 and into the upper part of the cylinder 10. The downward movement of the piston rod 21 simultaneously serves to dispense a cup from the dispenser 31 and to draw syrup from the container 27 into the pump 26. The fact that the high pressure in the tank 1 acts on both faces of the piston 13 avoids the need for the spring 24 to exert any force other than as necessary to overcome frictional forces and operate the auxiliary mechanical devices.

On reaching the end of its downward stroke, the piston rod 21 engages the push rod 35 which changes over the contact condition of the relay 37. The holding circuit of the relay 45 is thus broken, and a holding circuit to the relay 37 established through its own contacts so that this latter relay remains energized. The contacts of the relay 37 thus energize the relay 43 to open the normally closed valve 8, while the release of the relay 45 de-energizes relays 40, 41, 42 and 44. This has the effect of closing the previously open valves 11 and 18 and opening valve 17. It also allows the pawl 25 to reset. The pressure in the main supply pipe 6, which will be at least 10 pounds per square inch, and may be reduced as necessary by the reducing valve 7 if in too great excess of such a value, will then act on the lower surface of the piston 13 to an extent sufficient to overcome the force of the spring 24 and to effect a return stroke of the piston 13. This return stroke will act to expel the carbonated water previously drawn into the cylinder 10 back through the conduit 14, through the now open valve 17 and along the conduit 15 to the nozzle 16 where it will pass to the cup 30. Only a very low pressure is required for this purpose since the high pressure of tank 1 is now isolated by the closed valve 18. Simultaneously the upward movement of the piston rod 21 will act on the syrup pump 26 through the link 23 to eject a small quantity of syrup through the conduit 28 and also into the cup 30. If desired, means for ensuring mixing of the syrup and the carbonated water prior to actual entry into the cup may be provided, although this will not normally be found necessary. When the piston 13 reaches the top of the cylinder 10 again, the push rod 36 will be moved to open the contacts 38 and thus release relay 37 and de-energized relay 43 as a consequence. This action will return the valve 8 to its normally closed condition. Near the end of this upward stroke of the piston, the detent 22 will again be latched by the pawl 25 and the piston held against return movement until reactuated by the insertion of a fresh coin. The parts will then be back in the idle condition illustrated in Figure 2. This position has been referred to as the idle position because it is the position in which the parts come to rest after dispensing an amount of liquid. It might perhaps better be called the "cocked" position. Each energy cycle truly ends when the piston is in its downward position, because it is immediately after this time that each new charge of liquid is drawn into the machine.

The system just described has the further advantage over prior machines, in that there is eliminated the need for a liquid level control device to turn a pump on and off and thus regulate the level in the tank 1. Such devices are usually electrical and represent a frequent source of trouble. The same effect is produced in the present system by making the amount of water added to the tank almost equal to the quantity extracted each cycle by reason of the two ends of the cylinder 10 being of nearly equal volume displacement. The two ends could be made exactly equal with the hope that the level would then always be exactly maintained. However, this is considered to be a precarious balance which would eventually be upset by minor leaks. Instead, the amount added is made slightly less than the amount dispensed (by the volume of the piston rod) which forces the liquid level in the tank to drop very gradually as drinks are dispensed.

This depletion is stopped when the liquid level comes down to a small hole 15a drilled in the side of the conduit 15 which conducts the water out of the tank. Thereafter a small amount of gaseous carbon dioxide escapes with the water and a balance is achieved so that water in equals water out, and the extra volume required to fill the top of the cylinder 10 is supplied with gaseous carbon dioxide. If perchance the liquid level is too low, more of the hole 15a is uncovered and more carbon dioxide goes out with the water so that, in effect, less water is used than is added and the level tends to rise.

The number of conduits feeding into the receiving vessel 30 may be varied at will. If a hot beverage such as coffee is being dispensed, separate pumping systems for cream and sugar, similar to the syrup pump above described, will be required. Selection of those of these ingredients required by the purchaser will then be provided for by suitable mechanical linkages. In the same manner, the purchaser may select from a number of differently flavoured syrups, when a cold carbonated drink is being dispensed.

Figure 3 shows a simplified method by which the water may be conveyed to the dispensing nozzle. This simplified type of system may conveniently be used when the beverage to be dispensed is not carbonated and when the containing vessel may therefore be completely filled with water at low pressure. In this simplified system the tank 1 is replaced by a similar tank 46 which will be heated by means not shown. Water is forced into the upper part of a cylinder 47 above a piston 48 by pressure in the mains supply. This water enters along an incoming conduit 49 when a normally closed valve 50 is opened. A piston rod 51 similar to the piston rod 21 controls the electrical control system (not shown but similar in basic operation to that seen in Figure 2) of the machine, by means of suitable limit switches, so that when the piston 48 has reached the end of its downward stroke the valve 50 is allowed to close and a valve 52 situated in a conduit 53 extending from the tank 46 to a dispensing nozzle 54, is opened. The force of a spring 55 acting to push the piston 48 upwardly is then effective to force water from the tank 46 through to the nozzle 54. This sequence of events may be controlled by a coin operating mechanism in a like manner to that described with respect to the form of machine described in Figures 1 and 2.

The important feature of the present invention is the manner in which the power inherent in the water supply is employed as the sole operating power of the liquid dispensing system, thus eliminating the need for a pump. At the same time the mechanism provides mechanical energy for the syrup pumps and cup dispenser whereas normally other electric motors are required. A small quantity of electric power is required for the control circuit but this is sufficiently small to be provided by a battery should a source of mains electric power not be conveniently available. The invention has thus eliminated a pump, several actuating motors and a liquid level control system, all potential sources of breakdown. Although in the case of coffee dispensing machines, neither a pump nor a liquid level control has always been required in the past, the invention still retains its advantage over prior machines that all the auxiliary motors normally required for cup dispensing and secondary ingredient dispensing are eliminated.

Moreover, there is another advantage over prior systems that is common to both forms of the present invention. This is that the quantity of water dispensed is automatically controlled by the volume of the cylinder, whereas in the usual arrangement the volume is controlled by the length of time a valve is held open. Usually an additional electric motor is used to operate a timer and nearly always the volume dispensed is uncertain. Even if the timing is accurate, variations in pressure, temperature and condition of the valve produce severe variations in the amount dispensed. This cannot happen with the present system.

There is a further advantage of the form of invention illustrated in Figure 3. It has been found in conventional liquid dispensing machines that there is a tendency for air to accumulate in the tank as a result of heating of the water and the consequent evolution of air. This is particularly so after a prolonged stand-by period. The result is an excessive amount of air dispensed with the first charge of liquid drawn off, which has the disadvantage of reducing the amount of liquid dispensed, and also of making a splashy surge out of the nozzle. This evolution of air and the thermal expansion may also give rise to an undesirable pressure rise in the tank.

These disadvantages can be avoided by means of the system illustrated in Figure 3. As in the previously decribed form of operation, the piston rod 51 would be adjusted to close a pair of contacts effective to close the valve 50 when the required quantity of liquid has entered the cylinder 47. It is then only necessary to arrange the mechanism for further downward movement of the piston 48 to be possible, so that the cylinder 47 could then accept additional water from the tank 46 as the result of thermal expansion thereof or the evolution of air in such tank. Then, when the valve 52 was opened, the piston 48 would cause the gas and water to be discharged at a relatively constant and low pressure, the volume of liquid being discharged being independent of the amount of air which had collected. The volume of liquid dispensed would be slightly effected by any expansion due to heating, but this effect is of small consequence. In practice the main difficulty that the expansion gives rise to is an undue pressure build-up, and no such build-up could occur with the cylinder 47 providing an expansible system at all times connected to the tank. As in previous embodiments of the invention, the system would still have no need for a pressure regulating valve which is so commonly employed in other designs of liquid dispensing machine.

I claim:

1. A mechanism for dispensing a measured quantity of a liquid, said mechanism comprising an expansible chamber; means continuously tending to diminish the volume of said chamber; a first conduit containing first valve means connecting said chamber with a source of said liquid at a pressure sufficient to expand said chamber against the force of said means tending to diminish the volume thereof; a discharge conduit extending from said chamber; second valve means situated in said discharge conduit; and operating means for maintaining said second valve means closed while said first valve means are open to enable said expansible chamber to receive liquid from said source and expand, and for subsequently closing said first valve means while opening said second valve means to enable said means tending to diminish the volume of said chamber to expel such liquid therefrom and along said conduit.

2. A mechanism as claimed in claim 1, including a tank situated in said discharge conduit.

3. A mechanism for dispensing a measured quantity of liquid, said mechanism comprising a first expansible chamber; means continuously tending to diminish the volume of such chamber; a first conduit containing first valve means connecting said first chamber with a source of the liquid to be dispensed, said source being at a pressure sufficient to expand said chamber against the force of the means tending to diminish the volume thereof; a tank; a second conduit extending from said first chamber to said tank; second valve means situated in said second conduit; a second expansible chamber coupled to said first expansible chamber whereby to expand when said first expansible chamber contracts and vice versa; a further conduit extending from a lower part of said tank to said second expansible chamber; third valve means situated in such further conduit; a discharge conduit extending from said second expansible chamber; fourth valve means situated in said discharge conduit; and operating means for maintaining said second and third valve means closed while said first and fourth valve means are open to enable said first expansible chamber to receive liquid from said source and expand and thereby contract said second expansible chamber to expel liquid therefrom along said discharge conduit, and for subsequently closing said first and fourth valve means while opening said second and third valve means to enable said means tending to diminish the volume of said first expansible chamber to expel liquid therefrom into said tank and to expand said second expansible chamber to draw liquid thereinto from said tank.

4. A mechanism as claimed in claim 3, wherein said expansible chambers comprise the two ends of a cylinder defined by a piston movable therealong.

5. A mechanism as claimed in claim 3, including a pump mechanically connected to said second expansible chamber, a reservoir of a second liquid to be dispensed simultaneously with the first liquid connected to said pump, and a second discharge conduit extending from said pump, said mechanical connection being such as to cause said pump to draw in a quantity of said second liquid on expansion of said second expansible chamber and to expel such quantity of said second liquid along said second discharge conduit on contraction of said second expansible chamber.

6. A mechanism for dispensing a measured quantity of a carbonated beverage, said mechanism comprising a first expansible chamber; means continuously tending to diminish the volume of such chamber; a first conduit containing first valve means connecting said chamber with a water source at a pressure sufficient to expand said first chamber against the force of the means tending to diminish the volume thereof; a tank; a second conduit extending from said chamber to said tank; second valve means situated in said second conduit; a source of carbon dioxide under pressure; a third conduit extending from said carbon dioxide source to said tank; a second expansible chamber of slightly greater volume than said first expansible chamber, said second expansible chamber being coupled to said first expansible chamber to expand when said first expansible chamber contracts and vice versa; a further conduit extending from a lower part of said tank to said second expansible chamber; third valve means situated in such further conduit; a discharge conduit extending from said second expansible chamber; fourth valve means situated in said discharge conduit; and operating means for maintaining said second and third valve means closed while said first and fourth valve means are open to enable said first expansible chamber to receive liquid from said water source and expand and thereby contract said second expansible chamber to expel liquid therefrom along said discharge conduit, and for subsequently closing said first and fourth valve means while opening said second and third valve means to enable said means tending to diminish the volume of said first expansible chamber to expel liquid therefrom into said tank and to expand said second expansible chamber to draw liquid thereinto from said tank.

7. A mechanism as claimed in claim 6, wherein said further conduit communicating between said second expansible chamber and said tank projects downwardly into said tank to a lower part thereof, and includes an aperture communicating with said tank at a higher part thereof.

8. A mechanism for dispensing a measured quantity of a carbonated beverage, said mechanism comprising a cylinder; a piston movable along said cylinder whereby to define first and second expansible chambers at respective ends of said cylinder; a piston rod connected to said piston and extending outwardly of said cylinder through the first such expansible chamber, means continuously tending to urge said piston rod to move said piston to diminish the volume of such a first conduit containing first chamber; first valve means for connecting said first chamber with a water source at a pressure sufficient to expand said first chamber against the force of the means tending to diminish the volume thereof; a tank; a second conduit extending from said first chamber to said tank; second valve means situated in said second conduit; a source of carbon dioxide at a pressure greater than the pressure of said water source; a third conduit connecting said carbon dioxide source to said tank; a further conduit extending from said tank to said second expansible chamber; third valve means situated in such further conduit; a drinking vessel charging station; a discharge conduit extending from said second expansible chamber to said drinking vessel charging station; fourth valve means situated in said discharge conduit; and operating means for maintaining said second and third valve means closed while said first and fourth valve means are open to enable said first expansible chamber to receive liquid from said water source and expand and thereby contract said second expansible chamber to expel liquid therefrom along said discharge conduit, and for subsequently closing said first and fourth valve means while opening said second and third valve means to enable said means tending to diminish the volume of said first expansible chamber to expel liquid therefrom into said tank and to expand said second expansible chamber to draw liquid thereinto from said tank.

9. A mechanism as claimed in claim 8 including means for pumping auxiliary ingredients to said drinking vessel charging station, and means connecting said pumping means to said piston rod to effect discharge of a measured quantity of such an auxiliary ingredient upon movement of said piston rod to contract said second expansible chamber to expel liquid therefrom along said discharge conduit.

10. A mechanism as claimed in claim 8, including means for positioning a drinking vessel at said drinking vessel charging station, and means connecting such positioning means to said piston rod to effect positioning of said drinking vessel upon movement of said piston rod in the direction to expand said second expansible chamber.

11. A mechanism as claimed in claim 8, including a latching mechanism for holding said piston rod in the position in which said first expansible chamber is fully expanded.

12. A mechanism as claimed in claim 11, including actuating means for releasing said latching mechanism and for energizing said operating means to close said fourth valve means and simultaneously open said second and third valve means; means sensitive to movement of said piston rod to the position in which said first expansible chamber is fully contracted for energizing said operating means to close said second and third valve means and open said first and fourth valve means; and means sensitive to movement of said piston rod to the position in which said first expansible chamber is fully expanded, said latter means being adapted to actuate said operating means to close said first valve means.

References Cited in the file of this patent

UNITED STATES PATENTS

| | | |
|---|---|---|
| 2,536,400 | Thompson | Jan. 2, 1951 |
| 2,548,241 | Reynolds et al. | Apr. 10, 1951 |
| 2,755,979 | Lawson et al. | July 24, 1956 |

UNITED STATES PATENT OFFICE

CERTIFICATE OF CORRECTION

Patent No. 2,862,530 December 2, 1958

John W. Bell

It is hereby certified that error appears in the above numbered patent requiring correction and that the said Letters Patent should read as corrected below.

In the drawings, Sheet 1, the top of cylinder 10, in Figure 1, should be closed off to the left of the bottom of pipe 14.

Signed and sealed this 28th day of July 1959.

(SEAL)

Attest:
KARL H. AXLINE

Attesting Officer

ROBERT C. WATSON
Commissioner of Patents